United States Patent
Kim

(10) Patent No.: US 10,644,320 B2
(45) Date of Patent: May 5, 2020

(54) ELECTROLYTIC COPPER FOIL, ELECTRODE COMPRISING THE SAME, SECONDARY BATTERY COMPRISING THE SAME, AND METHOD FOR MANUFACTURING THE SAME

(71) Applicant: LS Mtron Ltd., Anyang-si, Gyeonggi-do (KR)

(72) Inventor: Seung Min Kim, Anyang-si (KR)

(73) Assignee: KCF TECHNOLOGIES CO., LTD., Anyang-si, Gyeonggi-Do (KR)

(*) Notice: Subject to any disclaimer, the term of this patent is extended or adjusted under 35 U.S.C. 154(b) by 168 days.

(21) Appl. No.: 15/661,309

(22) Filed: Jul. 27, 2017

(65) Prior Publication Data
US 2018/0062180 A1    Mar. 1, 2018

(30) Foreign Application Priority Data
Aug. 23, 2016    (KR) .................... 10-2016-0107230

(51) Int. Cl.
*B21C 37/00* (2006.01)
*H01M 4/66* (2006.01)
(Continued)

(52) U.S. Cl.
CPC ............. *H01M 4/661* (2013.01); *C25D 1/00* (2013.01); *C25D 1/04* (2013.01); *C25D 3/38* (2013.01); *C25D 5/04* (2013.01); *C25D 7/00* (2013.01); *H01M 4/0407* (2013.01); *H01M 4/0438* (2013.01); *H01M 4/0452* (2013.01);
(Continued)

(58) Field of Classification Search
None
See application file for complete search history.

(56) References Cited

U.S. PATENT DOCUMENTS 6,372,113 B2 *    4/2002    Yates ..................... C25D 1/04
                                                            205/111
2004/0104117 A1    6/2004    Yang et al.
(Continued)

FOREIGN PATENT DOCUMENTS

CN    103314474 A    9/2013
CN    105002550    * 10/2015    ............. C25D 21/00
(Continued)

OTHER PUBLICATIONS

Office Action mailed from TIPO dated Jan. 3, 2018 for the corresponding TW Patent Application No. 106128105.
(Continued)

*Primary Examiner* — Seth Dumbris
(74) *Attorney, Agent, or Firm* — K&L Gates LLP

(57) ABSTRACT

An electrolytic copper foil capable of securing a secondary battery having a high capacity retention rate, an electrode including the same, a secondary battery including the same, and a method of manufacturing the same. The electrolytic copper foil, which includes a first surface and a second surface opposite to the first surface, includes a copper layer including a matte surface facing the first surface and a shiny surface facing the second surface, and a first protective layer on the matte surface of the copper layer, wherein the first protective layer includes chromium (Cr) and the first surface of the electrolytic copper foil has an adhesion factor of 1.5 to 16.3.

17 Claims, 1 Drawing Sheet

(51) Int. Cl.
  *H01M 4/38*    (2006.01)
  *H01M 4/04*    (2006.01)
  *C25D 1/04*    (2006.01)
  *C25D 1/00*    (2006.01)
  *C25D 3/38*    (2006.01)
  *C25D 5/04*    (2006.01)
  *C25D 7/00*    (2006.01)
  *H01M 4/62*    (2006.01)
  *H01M 10/0525* (2010.01)

(52) U.S. Cl.
  CPC ........... *H01M 4/386* (2013.01); *H01M 4/628* (2013.01); *H01M 4/667* (2013.01); *H01M 10/0525* (2013.01); *Y10T 428/12431* (2015.01); *Y10T 428/12438* (2015.01)

(56) References Cited

U.S. PATENT DOCUMENTS

| | | | |
|---|---|---|---|
| 2010/0136434 A1 | 6/2010 | Hanafusa | |
| 2014/0017564 A1* | 1/2014 | Suzuki | C22F 1/08 429/211 |
| 2014/0193660 A1* | 7/2014 | Tsai | C25D 1/04 428/606 |
| 2016/0013493 A1* | 1/2016 | Shinozaki | C25D 1/04 205/50 |

FOREIGN PATENT DOCUMENTS

| | | | |
|---|---|---|---|
| CN | 105002550 A | 10/2015 | |
| EP | 3316363 A1 | 4/2016 | |
| JP | S6456399 A | 3/1989 | |
| JP | 2000-182623 A | 6/2000 | |
| JP | 2000182623 * | 6/2000 | ............... C25D 1/04 |
| JP | 2001329390 A | 11/2001 | |
| JP | 2003201592 A | 7/2003 | |
| JP | 2004162172 A | 6/2004 | |
| JP | 4948654 B2 | 3/2012 | |
| JP | 2013253707 A | 12/2013 | |
| JP | 2014132106 A | 7/2014 | |
| KR | 10-2013-0137708 A | 12/2013 | |
| WO | 2004/049476 A1 | 6/2004 | |
| WO | 2008/132987 | 11/2008 | |
| WO | 2013/129588 A1 | 9/2013 | |
| WO | 2014002996 A1 | 1/2014 | |
| WO | 2014/104233 A1 | 7/2014 | |

OTHER PUBLICATIONS

European search report dated Nov. 9, 2017 for European Patent Application No. 17187506.5 corresponding to the above-referenced U.S. application.

European Office Action for related European Application No. 17187506.5; action dated May 28, 2019; (5 pages).

Japanese Office Action and English translation for corresponding Japanese Application No. 2017-149094; action dated Oct. 23, 2018; (7 pages).

* cited by examiner

ELECTROLYTIC COPPER FOIL, ELECTRODE COMPRISING THE SAME, SECONDARY BATTERY COMPRISING THE SAME, AND METHOD FOR MANUFACTURING THE SAME

CROSS-REFERENCE TO RELATED APPLICATION

This application claims priority to and the benefit of Korean Patent Application No. 2016-0107230, filed on Aug. 23, 2016, the disclosure of which is incorporated herein by reference in its entirety.

BACKGROUND

1. Field of the Invention

The present invention relates to an electrolytic copper foil, an electrode including the same, a secondary battery including the same, and a method of manufacturing the same.

2. Description of Related Art

A secondary battery is a type of energy conversion device that converts electrical energy into chemical energy, stores the chemical energy, and generates electricity by converting the chemical energy into electrical energy when the electricity is needed, and is referred to as a "rechargeable battery."

Lead-acid batteries, nickel cadmium secondary batteries, nickel hydrogen secondary batteries, lithium secondary batteries, and the like are secondary batteries which are economically and environmentally advantageous compared to disposable primary batteries.

Lithium secondary batteries may store a relatively large amount of energy relative to a size and weight thereof in comparison to other secondary batteries. Therefore, in the field of information communication devices in which portability and mobility are important, the lithium secondary batteries are preferred and an application range thereof is also expanding to energy storage devices for hybrid vehicles and electric vehicles.

Lithium secondary batteries are used by repeatedly performing a cycle including charging and discharging. When operating a certain device with a fully charged lithium secondary battery, the lithium secondary battery should have a high charge and discharge capacity to increase an operating time of the device. Therefore, research to satisfy the ever-increasing expectations (needs) of consumers for charge and discharge capacity of a lithium secondary battery is continuously required.

Meanwhile, even though a secondary battery has a sufficiently high charge and discharge capacity, when the charge and discharge capacity of the secondary battery is rapidly reduced due to the repetition of the charge and discharge cycle (i.e., when a capacity retention rate of the secondary battery is low or a lifetime thereof is short), consumers will need to frequently replace the secondary battery, which will result in consumer inconvenience and waste of resources.

SUMMARY OF THE INVENTION

The present invention is directed to an electrolytic copper foil capable of preventing problems caused by limitations and disadvantages of the related art, an electrode including the same, a secondary battery including the same, and a method of manufacturing the same.

The present invention is directed to an electrolytic copper foil capable of securing a secondary battery having a high capacity retention rate.

The present invention is directed to an electrode capable of securing a secondary battery having a high capacity retention rate.

The present invention is directed to a secondary battery having a high capacity retention rate.

The present invention is directed to a method of manufacturing an electrolytic copper foil capable of securing a secondary battery having a high capacity retention rate.

In addition to the above-described aspects of the present invention, other features and advantages of the present invention will be described below or will become apparent to those skilled in the art from the following description.

According to an aspect of the present invention, there is provided an electrolytic copper foil having a first surface and a second surface opposite the first surface, the electrolytic copper foil including a copper layer including a matte surface facing the first surface and a shiny surface facing the second surface, and a first protective layer on the matte surface of the copper layer, wherein the first protective layer includes chromium (Cr), an adhesion factor of the first surface, which is defined by Equation 1 below, ranges from 1.5 to 16.3.

$$ADF = Pc/10 + DA_{Cr}/(mg/m^2) + R_{max}/\mu m \qquad \text{Equation 1:}$$

Here, ADF denotes an adhesion factor, Pc denotes a peak count, $DA_{Cr}$ denotes an amount of chromium (Cr) electrodeposition (mg/m$^2$), and $R_{max}$ denotes a maximum surface roughness (m).

In addition, a Pc of the first surface ranges from 5 to 110, a $DA_{Cr}$ of the first surface ranges from 0.5 to 3.8 mg/m$^2$, and a $R_{max}$ of the first surface ranges from 0.4 to 3.5 μm.

The electrolytic copper foil further includes a second protective layer on the shiny surface of the copper layer, wherein the second protective layer includes chromium (Cr), and the second surface has an adhesion factor of 1.5 to 16.3.

A Pc of the second surface ranges from 5 to 110, a $DA_{Cr}$ of the second surface ranges from 0.5 to 3.8 mg/m$^2$, and a $R_{max}$ of the second surface ranges from 0.4 to 3.5 μm.

The electrolytic copper foil has a yield strength of 21 to 63 kgf/mm$^2$ at room temperature.

The electrolytic copper foil has an elongation of 3% or more at room temperature.

According to another aspect of the present invention, there is provided a secondary battery electrode including an electrolytic copper foil including a first surface and a second surface opposite the first surface, and a first active material layer on the first surface of the electrolytic copper foil, wherein the electrolytic copper foil includes a copper layer including a matte surface facing the first surface and a shiny surface facing the second surface, and a first protective layer on the matte surface of the copper layer, the first protective layer includes chromium (Cr), and an adhesion factor of the first surface of the electrolytic copper foil, which is defined by Equation 1 below, ranges from 1.5 to 16.3.

$$ADF = Pc/10 + DA_{Cr}/(mg/m^2) + R_{max}/\mu m \qquad \text{Equation 1:}$$

Here, ADF denotes an adhesion factor, Pc denotes a peak count, $DA_{Cr}$ denotes an amount of chromium (Cr) electrodeposition (mg/m$^2$), and $R_{max}$ denotes a maximum surface roughness (m).

The first active material layer includes at least one active material selected from a group consisting of carbon, a metal (Me) such as Si, Ge, Sn, Li, Zn, Mg, Cd, Ce, Ni, or Fe, an alloy containing the metal, an oxide of the metal (MeO$_x$), and a composite of the metal and carbon.

The first active material layer includes Si.

The electrolytic copper foil further includes a second protective layer on the shiny surface of the copper layer, and the secondary battery electrode further includes a second active material layer on the second protective layer.

Adhesion between the electrolytic copper foil and the first active material layer is 25 N/m or more.

According to still another aspect of the present invention, there is provided a secondary battery, the secondary battery including a cathode, an anode, an electrolyte configured to provide an environment in which lithium ions may move between the cathode and the anode and a separator configured to electrically insulate the cathode from the anode, the anode including an electrolytic copper foil including a first surface and a second surface opposite the first surface, and a first active material layer on the first surface of the electrolytic copper foil, wherein the electrolytic copper foil includes a copper layer including a matte surface facing the first surface and a shiny surface facing the second surface, and a first protective layer on the matte surface of the copper layer, the first protective layer includes chromium (Cr), and an adhesion factor of the first surface of the electrolytic copper foil, which is defined by Equation 1 below, ranges from 1.5 to 16.3.

$$ADF = Pc/10 + DA_{Cr}/(mg/m^2) + R_{max}/\mu m \qquad \text{Equation 1:}$$

Here, ADF denotes an adhesion factor, Pc denotes a peak count, $DA_{Cr}$ denotes an amount of chromium (Cr) electrodeposition (mg/m$^2$), and $R_{max}$ denotes a maximum surface roughness (μm).

The first active material layer includes at least one active material selected from a group consisting of carbon, a metal (Me) such as Si, Ge, Sn, Li, Zn, Mg, Cd, Ce, Ni, or Fe, an alloy containing the metal, an oxide of the metal (MeO$_x$), and a composite of the metal and carbon.

The first active material layer includes Si.

The electrolytic copper foil further includes a second protective layer on the shiny surface of the copper layer, and the secondary battery electrode further includes a second active material layer on the second protective layer.

According to yet another aspect of the present invention, there is provided a method of manufacturing a secondary battery electrolytic copper foil, the method including forming a copper layer by applying electricity between a positive electrode plate and a rotating negative electrode drum which are disposed in an electrolytic solution containing 70 to 90 g/L of copper ions and 50 to 150 g/L of sulfuric acid to be spaced apart from each other and forming a protective layer on the copper layer, wherein the forming of the copper layer includes performing a heat treatment on a copper wire, pickling the heat-treated copper wire, preparing the electrolytic solution by introducing the pickled copper wire into sulfuric acid, performing electroplating by applying electricity between the positive electrode plate and the rotating negative electrode drum at a current density of 40 to 80 A/dm$^2$, and performing continuous filtration for removing solid impurities from the electrolytic solution at a flow rate of 31 to 45 m$^3$/hr while the electroplating is performed, wherein, while the electroplating is performed, total carbon (TC) in the electrolytic solution is maintained at 0.25 g/L or less, and a concentration of silver (Ag) therein is maintained at 0.2 g/L or less, the forming of the protective layer includes immersing the copper layer in an antirust solution containing 0.5 to 1.5 g/L of chromium (Cr).

The copper wire is heat-treated at a temperature of 600 to 900° C. for 30 to 60 minutes.

The electrolytic solution further contains chloride ions capable of precipitating silver (Ag) in the form of AgCl to prevent a concentration of silver (Ag) from exceeding 0.2 g/L by silver (Ag) being introduced into the electrolytic solution while the electroplating is performed.

The forming of the copper layer further includes introducing hydrogen peroxide and air into the electrolytic solution while the electroplating is performed.

A concentration of copper (Cu) in the antirust solution is maintained at 0.1 g/L or less.

The electrolytic solution further contains an organic additive selected from a group consisting of hydroxyethyl cellulose (HEC), organic sulfides, organic nitrides, and thiourea-based compounds.

The general description of the present invention as described above is merely intended to illustrate or explain the present invention and does not limit the scope of the present invention.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings.

It should be apparent to those skilled in the art that various modifications and alterations can be made in the present invention without departing from the spirit and scope of the invention. Therefore, the present invention includes all modifications and alterations that come within the scope of the invention as defined in the appended claims and equivalents thereof.

A lithium secondary battery includes a cathode, an anode, an electrolyte, which provides an environment in which lithium ions may move between the cathode and the anode, and a separator, which electrically insulates the cathode from the anode to prevent electrons generated at one electrode from being inefficiently consumed by moving the electrons to the other electrode through an inside of the secondary battery.

Figure 1:
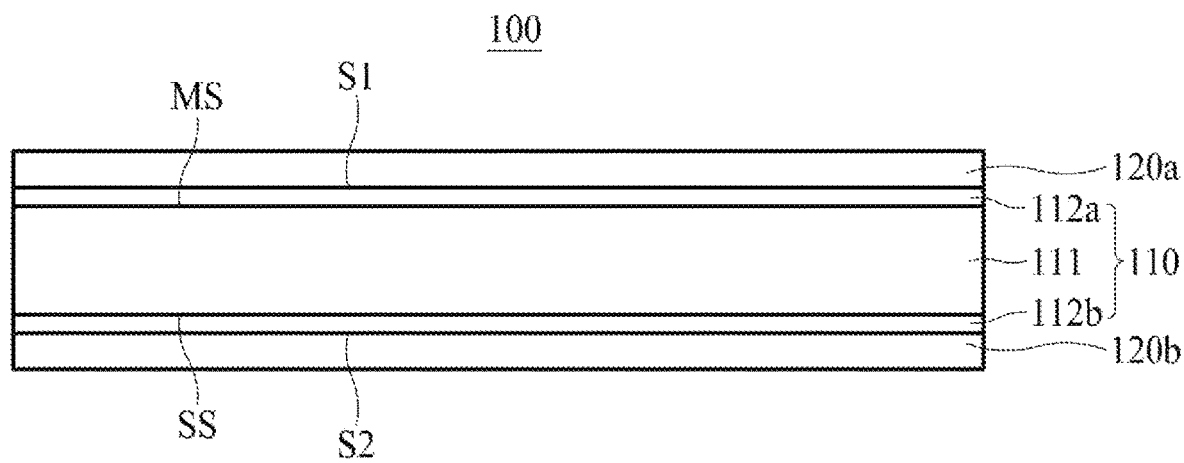
FIG. 1 is a cross-sectional view of a secondary battery electrode according to an embodiment of the present invention.

FIG. 1 is a cross-sectional view of a secondary battery electrode according to an embodiment of the present invention.

As illustrated in FIG. 1, a secondary battery electrode 100 according to an embodiment of the present invention includes an electrolytic copper foil 110 having a first surface S1 and a second surface S2 opposite the first surface S1, a first active material layer 120a on the first surface S1, and a second active material layer 120b on the second surface S2. In FIG. 1, an example in which the active material layers 120a and 120b are illustrated as being formed on both the first and second surfaces S1 and S2 of the electrolytic copper foil 110, respectively, but the present invention is not limited thereto, and the secondary battery electrode 100 of the present invention may include only one of the first and second active material layers 120a and 120b as an active material layer.

Generally, in a lithium secondary battery, an aluminum foil is used as a positive electrode current collector coupled to a positive electrode active material, and an electrolytic copper foil is used as a negative electrode current collector coupled to a negative electrode active material.

According to an embodiment of the present invention, the secondary battery electrode 100 is used as an anode of a lithium secondary battery, the electrolytic copper foil 110 functions as a negative electrode current collector, and each of the first and second active material layers 120a and 120b includes a negative electrode active material.

As illustrated in FIG. 1, the electrolytic copper foil 110 of the present invention, which functions as a negative electrode current collector of a secondary battery, includes a copper layer 111 having a matte surface MS and a shiny surface SS, a first protective layer 112a on the matte surface MS of the copper layer 111, and a second protective layer 112b on the shiny surface SS of the copper layer 111.

The matte surface MS is a surface of the copper layer 111 facing the first surface S1 of the electrolytic copper foil 110, and the shiny surface SS is a surface of the copper layer 111 facing the second surface S2 of the electrolytic copper foil 110.

The copper layer 111 of the present invention may be formed on a rotating negative electrode drum by electroplating being performed. The shiny surface SS thereof refers to a surface that comes into contact with the rotating negative electrode drum in an electroplating process, and the matte surface MS refers to a surface opposite the shiny surface SS.

Generally, the shiny surface SS has a lower surface roughness (Rz) than the matte surface MS, but the present invention is not limited thereto, and the surface roughness (Rz) of the shiny surface SS may be higher than or equal to that of the matte surface MS. Here, the roughness of each of the shiny surface SS and the matte surface MS refers to a ten-point mean roughness (Rz).

The first and second protective layers 112a and 112b include chromium (Cr) and are formed to prevent corrosion of the copper layer 111, improve heat resistance of the copper layer 111, and suppress a reduction of a charge and discharge efficiency of the secondary battery by increasing an adhesion strength between the copper layer 111 and the active material layers 120a and 120b.

In FIG. 1, an example in which the protective layers 112a and 112b are formed on both the matte surface MS and the shiny surface SS of the copper layer 111 is illustrated, but the present invention is not limited thereto, and the electrolytic copper foil 110 of the present invention may include only the first protective layers 112a as a protective layer.

The secondary battery electrolytic copper foil 110 of the present invention may have a yield strength of 21 to 63 kgf/mm$^2$ at room temperature (25±15° C.). The yield strength is measured using a universal testing machine (UTM), wherein a width of a sample is 12.7 mm, a distance between grips is 50 mm, and a measurement speed is 50 mm/min. When the yield strength of the electrolytic copper foil 110 is less than 21 kgf/mm$^2$, there is a risk of wrinkling due to a force applied in a process of manufacturing the electrode 100 and the secondary battery. On the other hand, when the yield strength of the electrolytic copper foil 110 is more than 63 kgf/mm$^2$, workability of the process of manufacturing the secondary battery is degraded.

The secondary battery electrolytic copper foil 110 of the present invention may have an elongation of 3% or more at room temperature (25±15° C.). When the elongation of the electrolytic copper foil 110 is less than 3%, the electrolytic copper foil 110 may not be stretched responding to the force applied in the process of manufacturing the electrode 100 and the secondary battery, and a risk of tearing the electrolytic copper foil 110 is increased.

The electrolytic copper foil 110 of the present invention may have a thickness of 3 to 20 μm.

Each of the first and second active material layers 120a and 120b includes at least one active material selected from the group consisting of carbon, a metal such as Si, Ge, Sn, Li, Zn, Mg, Cd, Ce, Ni, or Fe, an alloy containing the metal, an oxide of the metal, and a composite of the metal and carbon as a negative electrode active material.

In order to increase charge and discharge capacity of the secondary battery, the active material layers 120a and 120b may be formed of a mixture containing a predetermined amount of Si.

Meanwhile, as charging and discharging of the secondary battery is repeated, contraction and expansion of the active material layers 120a and 120b occur alternately. This causes separation of the active material layers 120a and 120b from the electrolytic copper foil 110, thereby reducing a charge and discharge efficiency of the secondary battery. Therefore, in order for the secondary battery to have a capacity retention rate and a lifetime of a certain level or more (i.e., in order to suppress deterioration of the charge and discharge efficiency of the secondary battery), the electrolytic copper foil 110 should have an excellent coating property with respect to the active material so that an adhesion strength between the electrolytic copper foil 110 and the active material layers 120a and 120b should be high.

Generally, it is known that the adhesion strength between the electrolytic copper foil 110 and the active material layers 120a and 120b may be improved by controlling the ten-point mean roughness (Rz) of the electrolytic copper foil 110. However, actually, the electrolytic copper foil 110 whose ten-point mean roughness (Rz) is appropriately adjusted (e.g., adjusted to be 2 μm or less) does not necessarily satisfy an adhesion force between the electrolytic copper foil 110 and the active material layers 120a and 120b required in a specification. Therefore, a capacity retention rate of 90% or more of the secondary battery, which is required in the industry, may not be secured.

Specifically, it is known that, when the active material layers 120a and 120b each include Si to increase the capacity of the secondary battery, a relationship between the ten-point mean roughness (Rz) of the electrolytic copper foil 110 and the capacity retention rate of the secondary battery is low.

According to the present invention, it is discovered by the inventors that, when securing the adhesive force between the electrolytic copper foil 110 and the active material layers 120a and 120b which is large enough to ensure the capacity retention rate of 90% or more of the secondary battery, (i) a peak count (Pc), (ii) an amount of chromium (Cr) electrodeposition ($DA_{Cr}$) (mg/m$^2$), and (iii) a maximum surface roughness ($R_{max}$) (μm) of the surface of the electrolytic copper foil 110 are important factors.

Figure 2:
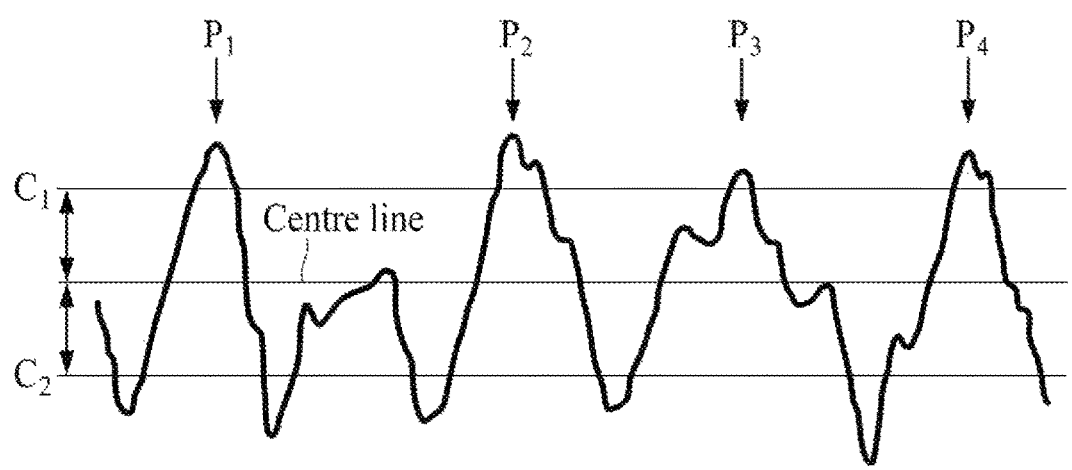
FIG. 2 illustrates a surface roughness profile obtained according to U.S. standard ASME B46.1-2009.

The peak count (Pc), along with the maximum surface roughness ($R_{max}$), affects a physical bonding force between the electrolytic copper foil 110 and the first active material layer 120*a*. Hereinafter, the peak count (Pc) will be described with reference to FIG. 2.

In the present invention, the peak count (Pc) may be obtained by measuring peak counts (Pc) of any three points on the first surface S1 of the electrolytic copper foil 110 and calculating an average value of measured values of the peak counts (Pc). The peak count (Pc) of each of the points is the number of effective peaks P1, P2, P3, and P4 which rise above a 0.5 μm upper criteria line C1 per 4 mm unit sample length in a surface roughness profile obtained according to U.S. standard ASME B46.1-2009. In this case, at least one valley deeper than a −0.5 μm lower criteria line C2 exists between adjacent effective peaks among the effective peaks. When there is no valley deeper than the −0.5 μm lower criteria line C2 between adjacent peaks which rise above the upper criteria line C1, all of the adjacent peaks may not be "effective peaks" used for measuring the peak count (Pc), and relatively lower peaks among the peaks are ignored when obtaining the number of "effective peaks."

According to an embodiment of the present invention, a peak count (Pc) of the first surfaces S1 of the electrolytic copper foil 110 ranges from 5 to 110.

When the peak count (Pc) is less than 5, an active specific surface area of the electrolytic copper foil 110 which may come into contact with the negative electrode active material is too small to ensure sufficient adhesion between the electrolytic copper foil 110 and the first active material layer 120*a*. On the other hand, when the peak count (Pc) is more than 110, coating uniformity of the negative electrode active material is degraded due to too many surface irregularities, and thus adhesion between the electrolytic copper foil 110 and the first active material layer 120*a* is significantly degraded.

The amount of chromium electrodeposition ($DA_{Cr}$) is a factor which affects a chemical bonding force between the electrolytic copper foil 110 and the first active material layer 120*a* and is measured by analyzing a solution obtained by dissolving the first surface S1 of the electrolytic copper foil 110 in dilute nitric acid (30 wt %) using atomic absorption spectrometry (AAS).

According to an embodiment of the present invention, the amount of chromium electrodeposition ($DA_{Cr}$) of the first surface S1 of the electrolytic copper foil 110 ranges from 0.5 to 3.8 mg/m$^2$.

When the amount of chromium electrodeposition ($DA_{Cr}$) is less than 0.5 mg/m$^2$, the first surface S1 of the electrolytic copper foil 110 may be oxidized, and thus sufficient adhesion may not be secured between the electrolytic copper foil 110 and the first active material layer 120*a*. On the other hand, when the amount of chromium electrodeposition ($DA_{Cr}$) is more than 3.8 mg/m$^2$, a hydrophobic property of the first surface S1 of the electrolytic copper foil 110 is increased and a chemical affinity with the negative electrode active material is lowered so that the adhesion between the electrolytic copper foil 110 and the first active material layer 120*a* is significantly reduced.

The maximum surface roughness ($R_{max}$), along with the peak count (Pc), is a factor which affects the physical bonding force between the electrolytic copper foil 110 and the first active material layer 120*a* and is measured according to Japanese Industrial Standards (JIS) B 0601-1994 (a measured length: 4 mm).

According to an embodiment of the present invention, the maximum surface roughness ($R_{max}$) of the first surface S1 of the electrolytic copper foil 110 ranges from 0.4 to 3.5 μm.

When the maximum surface roughness ($R_{max}$) is less than 0.4 μm, an active specific surface area of the electrolytic copper foil 110 which may come into contact with the negative electrode active material is too small to ensure sufficient adhesion between the electrolytic copper foil 110 and the first active material layer 120*a*. On the other hand, when the maximum surface roughness ($R_{max}$) is more than 3.5 μm, coating uniformity of the negative electrode active material is reduced due to an excessively uneven first surface S1 of the electrolytic copper foil 110, and thus the adhesion between the electrolytic copper foil 110 and the first active material layer 120*a* is significantly reduced.

According to the present invention, since three factors described above complexly affect the adhesion force between the electrolytic copper foil 110 and the active material layers 120*a* and 120*b*, an adhesion factor (ADF) of the first surface S1 of the electrolytic copper foil 110 is controlled to be in a range of 1.5 to 16.3. The ADF is defined by the following Equation 1.

$$ADF = Pc/10 + DA_{Cr}/(mg/m^2) + R_{max}/\mu m \qquad \text{Equation 1:}$$

Here, ADF denotes an adhesion factor, Pc denotes the peak count (number of effective peaks), $DA_{Cr}$ denotes an amount chromium electrodeposition (mg/m$^2$), and $R_{max}$ denotes the maximum surface roughness (μm).

When the ADF is less than 1.5, the active specific surface area of the first surface S1 of the electrolytic copper foil 110 which may come into contact with the negative electrode active material is too small, and thus the adhesion between the electrolytic copper foil 110 and the first active material layer 120*a* is reduced. On the other hand, when the ADF is more than 16.3, an affinity between the negative electrode active material and the electrolytic copper foil 110 is lowered, coating uniformity of the negative electrode active material is lowered due to too many surface irregularities, and thus the adhesion between the electrolytic copper foil 110 and the first active material layer 120*a* is significantly lowered.

The adhesion between the electrolytic copper foil 110 and the first active material layer 120*a* is, for example, 25 N/m or more. The adhesion may be obtained from a peel strength between the electrolytic copper foil 110 and the first active material layer 120*a*. More specifically, the adhesion between the electrolytic copper foil 110 and the first active material layer 120*a* ranges from 25 to 50 N/m.

In the embodiment of the present invention illustrated in FIG. 1, since both the first and second surfaces S1 and S2 of the electrolytic copper foil 110 are coated with the negative electrode active material, both the first and second surfaces S1 and S2 of the electrolytic copper foil 110 have an ADF of 1.5 to 16.3.

Also, a peak count (Pc) of each of the first and second surfaces S1 and S2 of the electrolytic copper foil 110 ranges from 5 to 110, an amount of chromium electrodeposition ($DA_{Cr}$) of each of the first and second surfaces S1 and S2 ranges from 0.5 to 3.8 mg/m$^2$, and a maximum surface roughness ($R_{max}$) of each of the first and second surfaces S1 and S2 ranges from 0.4 to 3.5 μm.

Meanwhile, a difference between the peak counts (Pc) of the first and second surfaces S1 and S2 is preferably 60 or less. When the difference between the peak counts (Pc) is more than 60, there is a risk that the capacity retention rate of the secondary battery is degraded due to a difference between structures of the first and second surfaces S1 and S2.

Hereinafter, a method of manufacturing an electrolytic copper foil 110 according to an embodiment of the present invention will be described in detail.

First, the copper layer 111 is formed by applying electricity between a positive electrode plate and a rotating negative electrode drum, which are disposed in an electrolytic solution containing 70 to 90 g/L of copper ions and 50 to 150 g/L of sulfuric acid to be spaced apart from each other. According to an embodiment of the present invention, the copper layer 111 is formed on the rotating negative electrode drum by performing electroplating at a current density of 40 to 80 A/dm$^2$.

According to the present invention, when the copper layer 111 is formed, the electrolytic solution is maintained so that total carbon (TC) in the electrolytic solution is maintained at 0.25 g/L or less. The TC may include total organic carbon (TOC) and total inorganic carbon (TIC) and may be analyzed through a TC measurement facility.

In order to maintain the TC of the electrolytic solution at 0.25 g/L or less, a high-purity copper wire is heat-treated to burn organic matter, the heat-treated copper wire is pickled, and the pickled copper wire is introduced into sulfuric acid to prepare an electrolytic solution having little or no impurities. The copper wire may be heat-treated at a temperature of 600 to 900° C. for 30 to 60 minutes.

Meanwhile, the method of the present invention may further include performing continuous (or circulating) filtration at a flow rate of 31 to 45 m$^3$/hr to remove solid impurities from the electrolytic solution while the electroplating is performed. When the flow rate is less than 31 m$^3$/hr, a flow velocity is lowered, overvoltage is increased, and the copper layer 111 is not uniformly formed. On the other hand, when the flow rate is more than 45 m$^3$/hr, a filter is damaged and foreign matter is introduced into the electrolytic solution.

Optionally, the TC may be lowered by decomposing organic matter in the electrolytic solution through an ozone treatment.

Optionally, cleanliness of the electrolytic solution may be improved by introducing hydrogen peroxide and air into the electrolytic solution while the electroplating is performed.

According to an embodiment of the present invention, a concentration of silver (Ag) in the electrolytic solution is maintained at 0.2 g/L or less when the copper layer 111 is formed (i.e., when the electroplating is performed). In order to prevent the concentration of silver (Ag) from exceeding 0.2 g/L by silver (Ag) being introduced into the electrolytic solution when the electroplating is performed, the electrolytic solution may contain a small amount (for example, 50 ppm or less) of chloride ions (Cl$^-$) capable of precipitating silver (Ag) in the form of AgCl.

The peak count (Pc) and the maximum surface roughness (R$_{max}$) of the first surface S1 of the electrolytic copper foil 110 may be respectively controlled to be 5 to 110 and 0.4 to 3.5 μm by managing each of the TC and the concentration of silver (Ag) in the above ranges and applying a current density of 40 to 80 A/dm$^2$ thereto.

Optionally, the electrolytic solution may further include an organic additive selected from the group consisting of hydroxyethyl cellulose (HEC), organic sulfides, organic nitrides, and thiourea-based compounds.

Next, the first and second protective layers 112a and 112b are formed on the copper layer 111 by immersing the copper layer 111 manufactured as described above in an antirust solution containing 0.5 to 1.5 g/L of Cr (e.g., at room temperature for 2 to 20 seconds) and drying the copper layer 111.

When a concentration of chromium (Cr) in the antirust solution is less than 0.5 g/L, the amount of chromium electrodeposition (DA$_{Cr}$) of the surface of the electrolytic copper foil 110 is less than 0.5 mg/m$^2$, oxidation of the surface of the electrolytic copper foil 110 is caused, and the chemical bonding force between the electrolytic copper foil 110 and the active material layers 120a and 120b is lowered.

On the other hand, when the concentration of chromium (Cr) in the antirust solution is more than 1.5 g/L, the amount of chromium electrodeposition (DA$_{Cr}$) of the surface of the electrolytic copper foil 110 exceeds 3.8 mg/m$^2$, the hydrophobic property of the surface of the electrolytic copper foil 110 is significantly increased, and the chemical affinity with the negative electrode active material is lowered, which eventually results in a reduction of the adhesion between the electrolytic copper foil 110 and the active material layers 120a and 120b.

The antirust solution may further include at least one of a silane compound and a nitrogen compound. For example, the antirust solution may include 0.5 to 1.5 g/L of Cr and 0.5 to 1.5 g/L of a silane compound.

Meanwhile, when a concentration of copper (Cu) in the antirust solution is too high, the amount of chromium (Cr) electrodeposited on the surface of the copper layer 111 is reduced. Therefore, according to an embodiment of the present invention, the concentration of copper (Cu) in the antirust solution is maintained at 0.1 g/L or less. When the concentration of copper (Cu) is more than 0.1 g/L, the amount of chromium electrodeposition (DA$_{Cr}$) of the surface of the electrolytic copper foil 110 is less than 0.5 mg/m$^2$, oxidation of the surface of the electrolytic copper foil 110 is caused, and the chemical bonding force between the electrolytic copper foil 110 and the active material layers 120a and 120b is lowered.

Meanwhile, the peak count (Pc) and the maximum surface roughness (R$_{max}$) of the second surface S2 of the electrolytic copper foil 110 may be controlled to be 5 to 110 and 0.4 to 3.5 μm, respectively, by adjusting a degree of polishing of a surface (e.g., a surface on which copper is precipitated by performing electroplating) of the rotating negative electrode drum.

According to an embodiment of the present invention, the surface of the rotating negative electrode drum is polished with an abrasive brush having a particle-size (Grit) of #800 to #1500.

The secondary battery electrode (i.e., an anode) of the present invention may be manufactured by coating the electrolytic copper foil 110 of the present invention manufactured as described above with the negative electrode active material.

The negative electrode active material may be selected from the group consisting of carbon, a metal such as Si, Ge, Sn, Li, Zn, Mg, Cd, Ce, Ni, or Fe, an alloy containing the metal, an oxide of the metal, and a complex of the metal and carbon.

For example, 1 to 3 parts by weight of styrene butadiene rubber (SBR) and 1 to 3 parts by weight of carboxymethyl cellulose (CMC) are mixed in 100 parts by weight of carbon for the negative electrode active material, and a slurry is then prepared using distilled water as a solvent. Next, the electrolytic copper foil 110 is coated with the slurry to have a thickness of 20 to 100 μm using a doctor blade and is pressed at a temperature of 110 to 130° C. under a pressure of 0.5 to 1.5 ton/cm$^2$.

The lithium secondary battery may be manufactured using a conventional cathode, an electrolyte, and a separator together with the secondary battery electrode (or the anode) of the present invention manufactured as described above.

Hereinafter, the present invention will be described in detail with reference to examples and comparative examples. However, the following examples are only examples to help understanding of the present invention, and the scope of the present invention is not limited to these examples.

Examples 1 to 4 and Comparative Examples 1 to 25

A copper layer was formed by applying electricity between a positive electrode plate and a rotating negative electrode drum which are disposed in an electrolytic solution to be spaced apart from each other. The electrolytic solution contained 75 g/L of copper ions, 100 g/L of sulfuric acid, and 0.08 g/L of silver (Ag), and was maintained at a temperature of 55° C. While electroplating was performed, continuous filtration for removing solid impurities from the electrolytic solution was performed at a flow rate of 37 m$^3$/hr.

Then, the copper layer was immersed in an antirust solution and dried to prepare an electrolytic copper foil.

Here, a TC in the electrolytic solution, a current density applied for electroplating, a concentration of chromium (Cr) in the antirust solution, and a concentration of copper (Cu) in the antirust solution are illustrated in the following Table 1.

TABLE 1

| | Total Carbon (TC) in Electrolytic Solution (g/L) | Current Density (A/dm$^2$) | Concentration of Cr in the Antirust Solution (g/L) | Concentration of Cu in the Antirust Solution (g/L) |
|---|---|---|---|---|
| Example 1 | 0.05 | 75 | 0.6 | 0.02 |
| Example 2 | 0.06 | 75 | 1.4 | 0.02 |
| Example 3 | 0.11 | 42 | 0.6 | 0.09 |
| Example 4 | 0.11 | 42 | 1.4 | 0.09 |
| Comparative Example 1 | 0.01 | 38 | 0.4 | 0.05 |
| Comparative Example 2 | 0.13 | 82 | 1.6 | 0.05 |
| Comparative Example 3 | 0.01 | 40 | 0.4 | 0.05 |
| Comparative Example 4 | 0.13 | 82 | 1.6 | 0.05 |
| Comparative Example 5 | 0.01 | 38 | 0.6 | 0.05 |
| Comparative Example 6 | 0.13 | 82 | 1.4 | 0.05 |
| Comparative Example 7 | 0.02 | 38 | 0.4 | 0.05 |
| Comparative Example 8 | 0.09 | 82 | 1.6 | 0.05 |
| Comparative Example 9 | 0.02 | 38 | 0.6 | 0.05 |
| Comparative Example 10 | 0.09 | 82 | 1.4 | 0.05 |
| Comparative Example 11 | 0.02 | 42 | 0.4 | 0.05 |
| Comparative Example 12 | 0.09 | 75 | 1.6 | 0.05 |
| Comparative Example 13 | 0.01 | 38 | 0.6 | 0.05 |
| Comparative Example 14 | 0.13 | 82 | 1.4 | 0.05 |
| Comparative Example 15 | 0.13 | 82 | 1.4 | 0.12 |
| Comparative Example 16 | 0.08 | 38 | 0.6 | 0.05 |
| Comparative Example 17 | 0.05 | 82 | 1.4 | 0.05 |
| Comparative Example 18 | 0.02 | 42 | 0.4 | 0.05 |
| Comparative Example 19 | 0.13 | 75 | 1.6 | 0.05 |
| Comparative Example 20 | 0.01 | 38 | 0.6 | 0.05 |
| Comparative Example 21 | 0.14 | 82 | 1.4 | 0.05 |
| Comparative Example 22 | 0.02 | 38 | 0.4 | 0.05 |
| Comparative Example 23 | 0.13 | 82 | 1.6 | 0.05 |
| Comparative Example 24 | 0.01 | 50 | 0.4 | 0.11 |
| Comparative Example 25 | 0.15 | 65 | 1.6 | 0.05 |

A peak count (Pc), an amount of chromium electrodeposition ($DA_{Cr}$), a maximum surface roughness ($R_{max}$), an ADF, and adhesion with an active material layer of each of first surfaces (e.g., surfaces of electrolytic copper foils facing matte surfaces of copper layers) of the electrolytic copper foils in Examples 1 to 4 and Comparative Examples 1 to 25 prepared in the above were measured or calculated as follows, and results thereof are illustrated in the following Table 2.

Peak Count (Pc)(ea)

The peak counts (Pc) of the first surfaces of the electrolytic copper foils were measured using a Mahrsurf M300 illuminometer manufactured by Mahr.

As described above, the peak count (Pc) is an average value of peak counts of any three points, and the peak count of each of the points is the number of effective peaks which rise above a 0.5 μm upper criteria line per 4 mm unit sample length in a surface roughness profile obtained according to U.S. standard ASME B46.1-2009. When there is no valley deeper than a −0.5 μM lower criteria line between adjacent peaks which rise above the upper criteria line, relatively lower peak(s) among the peaks were ignored when obtaining the number of "effective peaks."

Amount of Chromium Electrodeposition ($DA_{Cr}$) (mg/m$^2$)

The amount of chromium electrodeposition ($DA_{Cr}$) was measured by analyzing a solution obtained by dissolving a first surface of an electrolytic copper foil in diluted nitric acid (30 wt %) using AAS (Atomic Absorption Spectrometry).

Maximum Surface Roughness ($R_{max}$) (μm)

The maximum surface roughness ($R_{max}$) was measured using a Mahrsurf M300 illuminometer manufactured by Mahr according to JIS B 0601-1994 (a measured length: 4 mm).

ADF

The ADF was calculated by applying the peak count (Pc), the amount of chromium electrodeposition ($DA_{Cr}$), and the maximum surface roughness ($R_{max}$) of the first surface of the electrolytic copper foil obtained in the above to the following Equation 1.

$$ADF = Pc/10 + DA_{Cr}/(mg/m^2) + R_{max}/\mu m \quad \text{Equation 1:}$$

Adhesion with Active Material Layer (N/m)

(a) Specimen Preparation 2 parts by weight of SBR (styrene butadiene rubber) and 2 parts by weight of CMC (carboxymethyl cellulose) were mixed in 100 parts by weight of carbon that is commercially available as a negative electrode active material, and a slurry was then prepared using distilled water as a solvent. The slurry prepared in this manner was applied to a surface of an electrolytic copper foil, and the surface of the electrolytic copper foil was coated with the slurry (negative electrode active material slurry) to have a thickness of about 80 μm using a blade. Then, a drying process was performed at a temperature of 120° C., and an electrode was then prepared by performing a roll pressing process thereon. A 10 mm (width)×100 mm (length) specimen was obtained by cutting the electrode prepared in this manner.

(b) Adhesion Measurement

An active material portion of the specimen was attached to a reinforcing plate using a double-sided tape (3M VHB model), and a peel strength between the electrolytic copper foil and the active material was then measured according to a hydrochloric acid test method using ultrasonic thickness measurement (UTM) equipment (a crosshead speed: 50.0 mm/min, a measured length: 10 mm, and a 90° peeling test). The peel strength measured in this manner was adhesion of the specimen.

TABLE 2

| | Pc (ea) | $DA_{Cr}$ (mg/m$^2$) | ($R_{max}$)(μm) | ADF | Adhesion (N/m) |
|---|---|---|---|---|---|
| Example 1 | 107 | 0.7 | 0.4 | 11.8 | 28.8 |
| Example 2 | 108 | 3.7 | 1.2 | 15.7 | 29.5 |
| Example 3 | 5 | 0.7 | 3.4 | 4.6 | 29.7 |
| Example 4 | 5 | 3.6 | 3.4 | 7.5 | 31.2 |
| Comparative Example 1 | 4 | 0.4 | 0.3 | 1.1 | 21.4 |
| Comparative Example 2 | 112 | 4.1 | 3.8 | 19.1 | 23.3 |
| Comparative Example 3 | 5 | 0.4 | 0.3 | 1.2 | 22.9 |
| Comparative Example 4 | 109 | 4.1 | 3.8 | 18.8 | 22.1 |
| Comparative Example 5 | 4 | 0.6 | 0.3 | 1.3 | 21.9 |
| Comparative Example 6 | 111 | 3.5 | 3.8 | 18.4 | 22.4 |
| Comparative Example 7 | 4 | 0.4 | 0.5 | 1.3 | 22.0 |
| Comparative Example 8 | 112 | 4.1 | 2.9 | 18.2 | 22.8 |
| Comparative Example 9 | 4 | 0.6 | 0.5 | 1.5 | 23.9 |
| Comparative Example 10 | 111 | 3.5 | 2.9 | 17.5 | 23.6 |
| Comparative Example 11 | 6 | 0.4 | 0.5 | 1.5 | 24.2 |
| Comparative Example 12 | 106 | 4 | 2.9 | 17.5 | 22.1 |
| Comparative Example 13 | 5 | 0.6 | 0.3 | 1.4 | 23.7 |
| Comparative Example 14 | 112 | 3.5 | 3.8 | 18.5 | 20.9 |
| Comparative Example 15 | 109 | 3.5 | 3.7 | 18.1 | 21.0 |
| Comparative Example 16 | 4 | 0.6 | 2.7 | 3.7 | 24.3 |
| Comparative Example 17 | 111 | 3.4 | 1.7 | 16.2 | 23.5 |
| Comparative Example 18 | 5 | 0.3 | 0.5 | 1.3 | 22.2 |
| Comparative Example 19 | 107 | 3.9 | 3.7 | 18.3 | 23.4 |
| Comparative Example 20 | 5 | 0.9 | 0.3 | 1.7 | 23.6 |
| Comparative Example 21 | 111 | 3.5 | 3.9 | 18.5 | 21.3 |
| Comparative Example 22 | 4 | 0.3 | 0.5 | 1.2 | 22.1 |
| Comparative Example 23 | 112 | 3.7 | 3.7 | 18.6 | 24.5 |
| Comparative Example 24 | 15 | 0.3 | 0.3 | 2.1 | 21.7 |
| Comparative Example 25 | 82 | 3.7 | 4.1 | 16 | 23.6 |

According to the present invention, despite repetition of a charging and discharging cycle, a long-life secondary battery capable of maintaining a high charge and discharge capacity for a long time can be manufactured. Therefore, inconvenience of consumers of electronic products and resource waste due to the frequent replacement of secondary batteries can be minimized.

What is claimed is:

1. A secondary battery electrolytic copper foil, which includes a first surface and a second surface opposite the first surface, the electrolytic copper foil comprising:
a copper layer including a matte surface facing the first surface and a shiny surface facing the second surface; and a first protective layer on the matte surface of the copper layer, wherein:

the first protective layer comprises chromium (Cr);

an adhesion factor of the first surface, which is defined by Equation 1 below, ranges from 1.5 to 16.3:

$$ADF=Pc/10+DA_{cr}/(mg/m^2)+R_{max}/\mu m \qquad \text{Equation 1:}$$

wherein, ADF denotes an adhesion factor, Pc denotes a peak count, DAcr denotes an amount of chromium (Cr) electrodeposition (mg/m$^2$), and $R_{max}$ denotes a maximum surface roughness (μm);

a Pc of the first surface ranges from 5 to 110;

a DAcr of the first surface ranges from 0.5 to 3.8 mg/m$^2$; and a $R_{max}$ of the first surface ranges from 0.4 to 3.5 μm.

2. The electrolytic copper foil of claim 1, further comprising a second protective layer on the shiny surface of the copper layer, wherein:

the second protective layer comprises chromium (Cr); and the second surface has an adhesion factor of 1.5 to 16.3.

3. The electrolytic copper foil of claim 2, wherein:

a Pc of the second surface ranges from 5 to 110;

a DAcr of the second surface ranges from 0.5 to 3.8 mg/m$^2$; and a $R_{max}$ of the second surface ranges from 0.4 to 3.5 μm.

4. The electrolytic copper foil of claim 1, wherein the electrolytic copper foil has a yield strength of 21 to 63 kgf/mm$^2$ at room temperature.

5. The electrolytic copper foil of claim 1, wherein the electrolytic copper foil has an elongation of 3% or more at room temperature.

6. A secondary battery electrode comprising:

the electrolytic copper foil of claim 1; and a first active material layer on the first surface of the electrolytic copper foil.

7. The secondary battery electrode of claim 6, wherein the first active material layer comprises at least one active material selected from a group consisting of carbon, a metal (Me), an alloy containing the metal, an oxide of the metal (MeO$_x$), and a composite of the metal and carbon.

8. The secondary battery electrode of claim 6, wherein the first active material layer comprises Si.

9. The secondary battery electrode of claim 6, wherein:

the electrolytic copper foil further comprises a second protective layer on the shiny surface of the copper layer; and the secondary battery electrode further comprises a second active material layer on the second protective layer.

10. The secondary battery electrode of claim 6, wherein adhesion between the electrolytic copper foil and the first active material layer is 25 N/m or more.

11. A secondary battery comprising:

a cathode;

an anode;

an electrolyte configured to provide an environment in which lithium ions move between the cathode and the anode; and a separator configured to electrically insulate the cathode from the anode, wherein the anode comprises:

the electrolytic copper foil of claim 1; and a first active material layer on the first surface of the electrolytic copper foil.

12. The secondary battery of claim 11, wherein the first active material layer comprises at least one active material selected from a group consisting of carbon, a metal (Me), an alloy containing the metal, an oxide of the metal (MeO$_x$), and a composite of the metal and carbon.

13. The secondary battery of claim 11, wherein the first active material layer comprises Si.

14. The secondary battery of claim 11, wherein:

the electrolytic copper foil further comprises a second protective layer on the shiny surface of the copper layer; and the secondary battery further comprises a second active material layer on the second protective layer.

15. The secondary battery of claim 11, wherein adhesion between the electrolytic copper foil and the first active material layer is 25 N/m or more.

16. The secondary battery electrode of claim 7, wherein the metal (Me) comprises Si, Ge, Sn, Li, Zn, Mg, Cd, Ce, Ni, or Fe.

17. The secondary battery of claim 12, wherein the metal (Me) comprises Si, Ge, Sn, Li, Zn, Mg, Cd, Ce, Ni, or Fe.

* * * * *